United States Patent

Zucker

[15] 3,680,082

[45] July 25, 1972

[54] NUMERICAL ENCODING KEYBOARD

[72] Inventor: Fredric E. Zucker, Stamford, Conn.

[73] Assignee: Pitney-Bowes, Inc., Stamford, Conn.

[22] Filed: Jan. 18, 1971

[21] Appl. No.: 107,175

[52] U.S. Cl. ....................340/365, 179/90 K

[51] Int. Cl. ....................G08c 1/00

[58] Field of Search ..........340/365, 147 A, 152 R, 149 A; 339/18; 178/17 C, 17 R, 79, 86; 235/145 R, 61.7 B; 200/16, 17, 18, 178, 5 R, 5 A; 179/90 B, 2 CA, 90 K

[56] References Cited

UNITED STATES PATENTS

| | | | |
|---|---|---|---|
| 3,062,921 | 11/1962 | White | 340/365 |
| 3,060,276 | 10/1962 | Huffman | 179/90 B |
| 1,973,096 | 9/1934 | Norton | 200/5 A |

*Primary Examiner*—John W. Caldwell
*Assistant Examiner*—Robert J. Mooney
*Attorney*—William D. Soltow, Jr., Albert W. Scribner, Martin D. Wittstein and Louis A. Tirelli

[57] ABSTRACT

An encoder transmits numerical data in the form of coded bursts of audio frequency tones. The encoder includes levers which move through successive index positions in slots having numerical indicia. Each lever represents a different decimal order digit of the price of merchandise sold. Each lever is provided with a plurality of encoding switches which are moved past stationary switch actuators. Different groups of switch actuators are aligned with successive index positions of the levers to actuate selected pairs of switches according to the numerical indicia with which the levers are aligned. A tone generator is electrically coupled to the switches by a multiplexer to produce a serial output comprising frequencies which uniquely identify the selected data.

13 Claims, 5 Drawing Figures

INVENTOR
Fredric E. Zucker
BY
Albert W. Scribner
ATTORNEY.

INVENTOR
Fredric E. Zucker
BY
Albert W. Scribner
ATTORNEY.

NUMERICAL ENCODING KEYBOARD

FIELD OF THE INVENTION

This invention relates to an encoder for transmitting numerical data. More specifically, the encoder generates electrical bursts of audio frequency tones representing financial data such as the price of merchandise sold.

BACKGROUND

Various types of electronic data processing installations have a need to exchange numerical information with each other over telephone or other transmission lines. The preferred form for transmitting such numerical data is a frequency code such as Bell System's Touch-Tone, in which each numeral is represented by a unique combination of two audio frequency tones sent out simultaneously. Touch-Tone is a two-out-of-eight code of which numerics comprise a two-out-of-seven subset, in which one of the frequencies, designated *fa*, is selected from a group of four frequencies *f1* through *f4*, and the other, *fb*, is selected from a group of three frequencies *f5* through *f7*; but other specific frequency code formats are possible. The frequency tones are transmitted in pulsed bursts, thus achieving all the noise immunity usually associated with digital transmission techniques, and those associated with frequency coding techniques as well.

The Bell System supplied its data communications subscribers with Type 4O3 data sets which contain pulse tone generators corresponding to frequencies *f1* through *f7*. These data sets have eight individual input terminals, one for each of the eight tone generators. Thus, Touch-Tone encoding (i.e., selection of the appropriate tone combination) must be done externally of the 4O3 data set, by the telephone subscriber's own encoding equipment. In certain applications, design of this encoding equipment presents problems.

One example of a numerical data communication net in which Touch-Tone code is employed for transmission is a credit card verification system having a central computer facility and a plurality of remote sales stations. When a customer presents his credit card at one of the sales stations, an automatic reader device at that station scans machine-readable numerical information on the card which identifies the subscriber's account, and transmits the account number, encoded in Touch-Tone form, over telephone lines to the computer at the central station. The computer then determines whether or not the card is stolen, expired, spurious, or otherwise unacceptable; and transmits an answer back over the phone line to the remote sales station.

Some credit card verification systems also have means at the remote sales station for transmitting to the central computer station an indication of the amount of the proposed credit sale. In such systems, the computer at the central station is programmed to look up the subscriber's present account balance, compare it to the amount of the proposed sale to determine whether that sale will exceed the subscriber's authorized credit limit, and report back to the remote sales station if the sale amount is excessive. The computer may also use the amount of sale information to do automatic monthly billing.

The means at the remote sales station for transmitting the proposed sale amount may be a keyboard driving an encoder for translating key actuations into Touch-Tone code. One could use for this purpose a conventional 10-key or 12-key telephone type of push-button keyboard, in which each push-button represents a particular decimal digit one to zero, and actuates encoding switches which uniquely select the appropriate pair of frequency tones for that digit. Such a push-button encoder, however, does not clearly identify which decimal order digit (e.g. pennies, dimes, dollars, etc.) is represented by a particular push-button actuation. There are 10-key devices, such as are used in adding machines and postage meters, for automatically keeping track of the decimal order of each successive key actuation; but these devices are expensive.

Alternatively, a full keyboard could be employed to identify decimal orders. Such a keyboard has a separate column of keys for each decimal order, and each column contains 10 numeral keys. The full keyboard eliminates ambiguities as to decimal order, but demands an undesirably high number of Touch-Tone encoding switches, each of which must actuate its own individual pair of encoding switches. The multiplicity of switches and the accompanying wiring which they entail severely crowd the space below the keyboard.

In a keyboard for encoding the amount of a sale in Touch-Tone form, even if the maximum sale amount is 10 dollars, the keyboard must have a four-decimal-order capacity. Maximum sale amounts of 100 dollars or more complicate the keyboard still further. Accordingly, there is a need for a simple and uncrowded keyboard capable of encoding several decimal orders of numerical information in Touch-Tone or other multi-level data code form.

SUMMARY OF THE INVENTION

In a device for transmitting numerical data in accordance with the invention, audio frequency bursts are generated in combinations selected to represent numerical data such as the amount of a credit charge. A convenient table-mountable housing contains a keyboard to register the amount of a sale. The keyboard includes a number of parallel slots formed in the housing, one slot for each decimal order. The slots each have a lever movably therein, which may be aligned with numerical indicia placed along the slot in increasing order. Each lever actuates a number or electrical switches. For example, the switches may be moved therewith past selectively placed stationary switch actuators.

As the levers are registered with the desired numerical indicia, predetermined pairs of switches on each lever are actuated to encode the pairs of audio frequency tones which uniquely identify the amount entered. The pairs of actuated switches are effectively coupled to respective tone generators which produce the audio frequency bursts.

A multiplexer is employed to enable the actuated switches on successive levers and energize the tone generators in decimal order sequence. The resulting output from the tone generator is a serial train of audio bursts. These bursts may be sent over a suitable transmission path such as a telephone line, and used for control of, or input to, a data processor.

An encoder in accordance with this invention is particularly useful in a credit card verification system, for determining whether a sale would exceed the spending limit of a credit card subscriber, and to update computer billing records on a real-time basis.

As an additional feature of the invention, the registration of a lever with desired numerical indicia is used to position a printing wheel relative to a record sheet, e.g., a charge slip to be imprinted with the sale amount. The printed character then corresponds with the numerical data encoded, making the sale information available both for nearby and remote use or display.

DETAILED DESCRIPTION OF THE PREFERRED EMBODIMENT

Figures 1, 2:
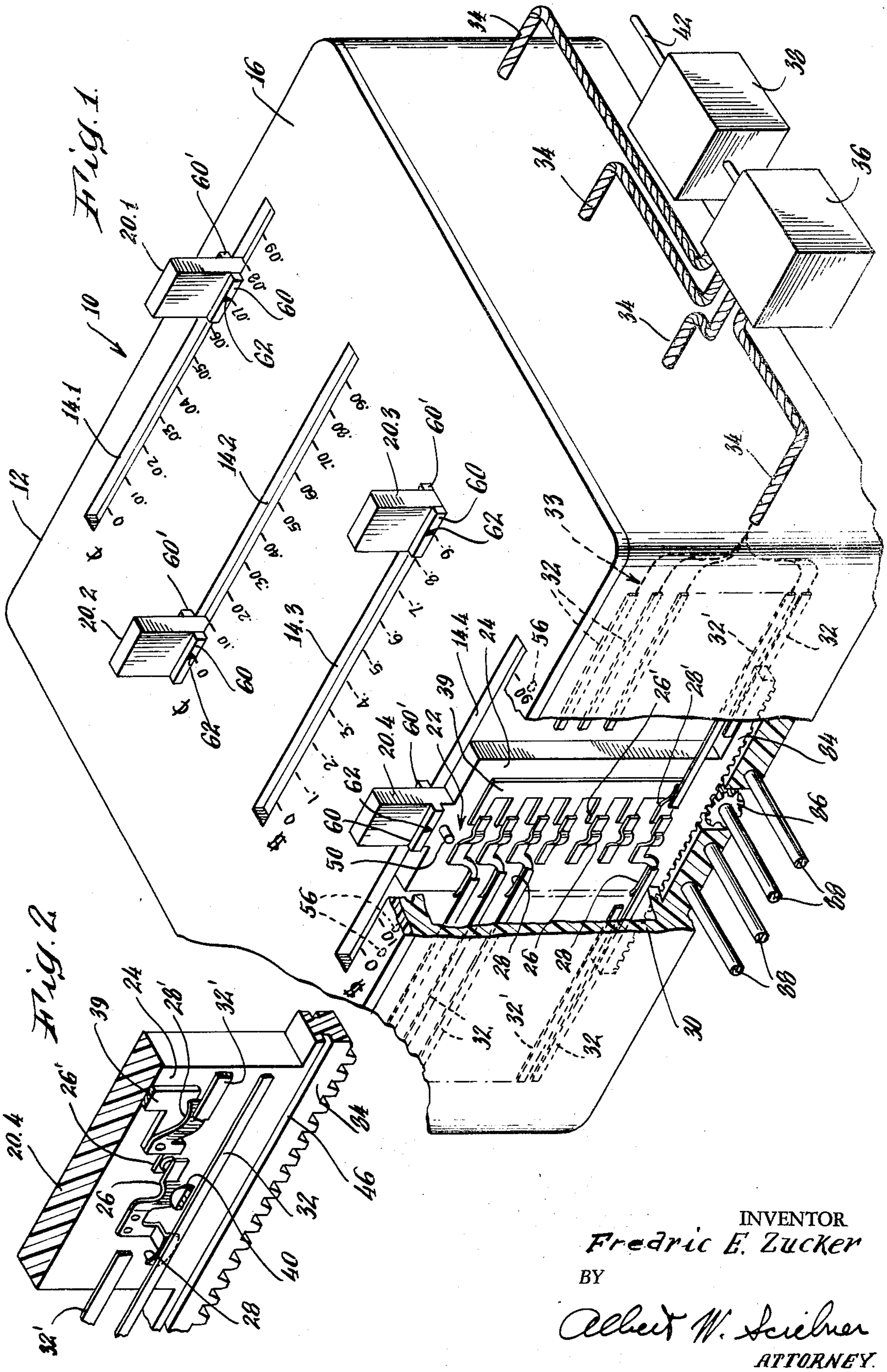
FIG. 1 is a perspective broken view of an encoder in accordance with the invention.
FIG. 2 is an enlarged perspective view of a switch for use with the encoder of FIG. 1.

With reference to FIG. 1, an encoder 10 comprises a housing 12 which is sized for convenient table top mounting. Housing 12 is provided with a plurality of lever guide slots 14 arranged parallel with one another in the top surface 16 of housing 12.

Each slot 14 represents one decimal order of a sale price as shown by the indicia on the housing, specifically pennies for slot 14.1, dimes for slot 14.2, and dollars for slot 14.3. Any number of additional slots such as 14.4 may be provided to accommodate tens of dollars and higher decimal orders as desired.

A lever 20 is mounted for sliding movement in each slot 14. Each lever 20 may be moved to successive positions which are in alignment with the successively increasing price indicia. Levers 20 are formed of insulating material such as plastic, and are each provided with a linear bank of seven vertically spaced switches such as the one generally designated 22. All the switches 22 of each lever 20 are located on the same surface 24 of that lever.

Each switch 22 is formed of a pair of normally open contact elements 26–26'; element 26 being bent away from surface 24 so as to be cantilevered into overlapping, confronting relationship with the other contact element 26'. Contact element 26 is formed of a resiliently flexible material, so that contact closure may be obtained by urging element 26 into electrical contact with element 26', and so that the contacts spring open when released.

As the levers 20 move in slots 14, switches 22 are kept connected in their electrical circuits by slide busses. Spring fingers such as 28 and 28' are bent from respective contact elements 26–26', and extend away from surface 24 of each lever 20 toward a housing wall 30 or internal partition 30' (see FIG. 4), as the case may be, which faces the lever 20. Walls 30 and partitions 30' are provided with parallel strip conductors 32 which extend the length of slots 14. Spring fingers 28–28' each slide along in contact with respective conductor strip 32. One end 33 of each conductor strip 32 is connected to a strand of an electrical cable 34 for connection to a multiplexer 36. The multiplexer 36 in turn is coupled to the input of a pulse tone generator 38.

The contact elements 26' of all the switches 22 on a given lever 20 are tied together to a common buss 39. A single spring finger contact 28' is employed to connect buss 39 to pulse tone generator 38 through sliding contact with a conductor strip 32'.

The enlarge view of FIG. 2 illustrates the spatial relationship between spring fingers 28 and 28' and the conductor strips 32 and 32'. Spring finger 28 extends away from surface 24 at a location which is slightly below contact element 26. Spring finger 28' extends away from surface 24 at a location which is slightly above contact element 26'. Therefore the conductor strips 32 may be spaced apart sufficiently for switch actuators 40 to pass between them. Actuators 40 are protrusions molded integrally on walls 30 and partitions 30'. These actuators are sized to protrude into the path of movement of contact elements 26, and effect contact closure by urging the element 26 into electrical contact with element 26' as the lever 20 moves into position.

Pulse tone generator 38 is of the type that produces audio frequency tone bursts on its output line 42. The frequency of these tones is determined by which input lines have been connected to the generator 38 by switches 22. In a typical pulse tone generator the decimal digits zero through nine are encoded by combining pairs of audio tones $f_a$ and $f_b$ respectively selected from groups of four and three tones.

In the encoder of this invention, the tone pairs for each decimal digit are selected by actuating a predetermined pair of switches 22 on the lever 20 for that digit. Switch selection is obtained by providing an appropriate pair of switch actuators such as 40 in Touch-Tone code pattern for each of the values one through zero which each decimal digit can assume. The particular pair of actuators 40 for each value is aligned with its corresponding dollar or cents indicia 0 through .09, 0 through .90, etc., so that the operator can visually select the sale amount to be encoded.

Figures 3, 4, 5:
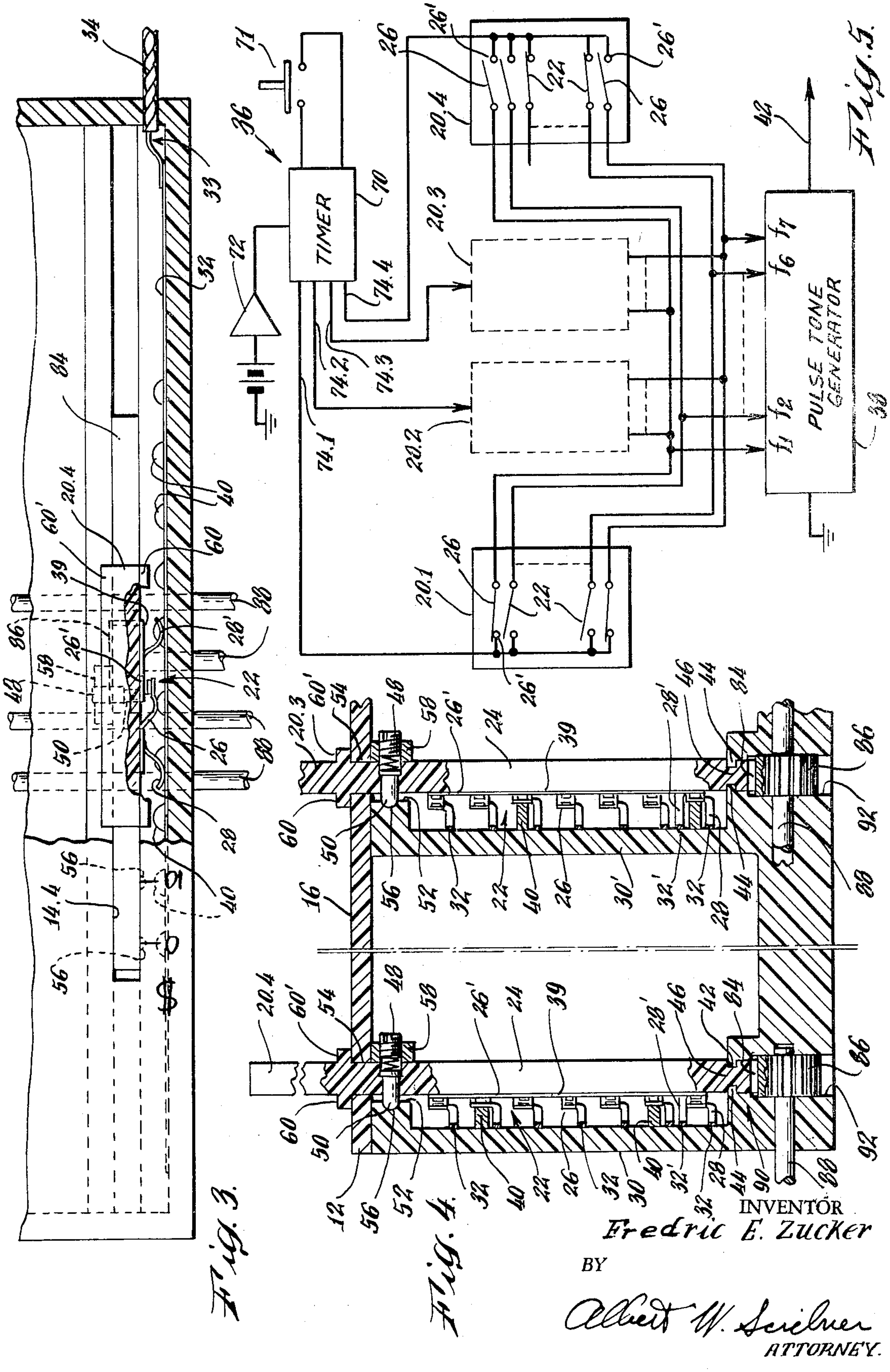
FIG. 3 is a partial horizontal section of the encoder of FIG. 1.
FIG. 4 is a vertical section of the encoder of FIG. 1.
FIG. 5 is an electrical schematic circuit diagram of the encoder of FIG. 1.

With further reference to FIGS. 3 and 4, each lever 20 is vertically retained by a pair of interfitting tongues 44 and grooves 46 located at the lower end 90 of lever 20, and is provided with a detent 48 below the top surface 16 of housing 12. Each detent 48 includes a spring-biased pin 50 which slides along surface 52 of a wall 30 or partition 30' and urges lever 20 toward edge 54 of slot 14. Surfaces 52 are provided with spaced detent-receiving recesses such as 56, which are in alignment with the numerical indicia on surface 16. Recesses 56 provide successive index positions of lever 20 for precise registration with the indicia and the switch actuators 40.

Each detent 48 is mounted on a bar 58 which fits flush with the inside of the top of housing 12 for enhanced sliding guidance of the lever 20 along slot 14. A flange 60 is provided on lever 20 to carry an indicator mark 62 (See FIG. 1) in proximity to the numerical indicia on surface 16. The flange 60 also includes an oppositely projecting portion 60' which serves to capture lever 20 between bar 58 and the top of housing 12.

FIG. 4 illustrates the location of actuators 40 at particular index positions aligned with particular pairs of switches to select the desired pairs of audio frequencies available from tone generator 38. The actuators 40 currently selected by lever 20.4 in FIGS. 1 and 4 close a particular pair of switches 22 which characterize the digit four (i.e. 40 dollars), while the actuators 40 selected by lever 20.3 close a pair of switches 22 to characterize the digit nine (i.e. 9 dollars), and so on, to represent a total sale price of $49.07. Hence, for each lever position a pair of switches are closed and a pair of audio frequency tone bursts is generated by tone generator 38.

Multiplexer 36, as shown in greater detail in FIG. 5, sequentially couples the chosed pairs of switches on successive decimal order levers 20 to actuate the tone generator 38. The multiplexer comprises a single-cycle electromechanical timer 70 which is started by a push-button switch 71.

Timer 70 sequentially couples the output of an amplifier 72 (in a break-before-make manner) to timer output lines 74. Amplifier 72 is energized by a DC voltage source 76 and provides electrical pulses selected to initiate pairs of tone signals at the tone generator 38.

The timer output lines 74.1 and 74.4 are respectively coupled to the common busses 39 on levers 20 through conductor strips 32'. As timer 70 applies the voltage from amplifier 72 to, for example, output line 74.1, current is passed through those switches 22 which are currently actuated on lever 20.1. As shown in FIG. 5, contact elements 26 on each lever 20 are respectively coupled to the tone-producing inputs $f1$ and $f7$ of tone generator 28. For the closed lever-mounted switches 22 on lever 20.1, current from amplifier 72 is directed to inputs $f1$ and $f7$ of tone generator 38, causing the latter to produce a corresponding pair of audio frequency tones.

In the multiplexer arrangement of FIG. 5 corresponding elements 26 on the several lever switches 22 are electrically coupled to one another. Since timer 70 engages one output line 74 at a time, while the remaining output lines are unconnected, the direct wire coupling between corresponding contact elements 26 is permissible. Alternatively, digital isolation networks such as conventional "or" circuits could be employed to isolate corresponding contact elements from one another electrically.

As timer 70 sequentially energizes output lines 74, pairs of tone bursts are transmitted over the output line 42 of tone generator 38, and these represent decimal digits corresponding to the indicia with which levers 20 are registered.

The electrical tone representation of sale price information is conveniently accompanied by mechanical printing of the same data on a credit charge slip. As shown in FIGS. 1, 3 and 4, each lever is provided with a rack 84 which engages a pinion 86. A shaft 88 extends from each pinion 86 to rotate a conventional printing wheel (not shown). Racks 84 are either mounted or integrally molded at the lower ends 90 of levers 20 and fit freely within grooves 92 in housing 12 for movement parallel with slots 14. Housing 12 is sized to accommodate the entire travel of racks 84 as levers 20 are moved to desired index positions along slot 14. The four shafts 88 emerge from the encoder housing 88 in side-by-side relationship as seen in FIG. 1.

Now that apparatus for encoding numerical data in frequency form has been described, the advantages and features of the invention may be appreciated. In particular, placement of the encoding switches on the moving levers conveniently reduces the number of switches needed for frequency coding.

Since the foregoing description and drawings are merely illustrative, the scope of protection of the invention has been more broadly stated in the following claims; and these should be liberally interpreted so as to obtain the benefit of all equivalents to which the invention is fairly entitled.

The embodiments of the invention in which an exclusive property or privilege is claimed are defined as follows:

1. An apparatus for encoding numerical data comprising:

a tone generator provided with a plurality of input leads whose selective electrical interconnection determines the frequency of the tone generator output pulses;

a housing having lever guide slots, said house carrying numerical indicia alongside said slots at successive lever locations;

levers mounted on the housing for movement in the slots to register with desired indicia;

switches effectively mounted for movement by the levers and electrically coupled to respective input leads of the tone generator for selective input lead interconnection upon switch actuation;

and switch actuators mounted along the path of motion of said switches in actuating alignment with selected ones of said switches and at locations which are in predetermined relationship with said indicia, whereby tone generator outputs that are indicative of desired numerical data are selected.

2. The apparatus data of claim 1 further comprising:

means for sequentially coupling said switches to the tone generator to produce a serial train of audio frequency output pulses representative of the desired numerical indicia in registration with the levers.

3. The apparatus of claim 1 wherein said switches are mounted on the levers, said switch actuators being mounted to the housing alongside the path of movement of the levers.

4. The apparatus of claim 3 wherein said switches are mounted alongside one another on the levers and have contact means actuatable in a direction generally towards a surface of a lever, with said switch actuators being located to project into the path of the lever-mounted switches and arranged to cam said contact means in said actuating direction.

5. The apparatus of claim 4 wherein the switches are formed of spaced overlapping contact elements extending parallel with one another on the surface of the levers and wherein the switch actuators are each formed of a protrusion extending in the path of a contact element for its movement towards an overlapped contact element to actuate a switch.

6. The apparatus of claim 1 further including respective racks responsive to the levers as they are moved along said slots, and pinions operatively engaged with said racks to provide pinion rotation corresponding to the numerical indicia registered with said levers.

7. An encoder comprising one or more switch-moving elements, means mounting each said element for movement between a plurality of data selecting positions, a plurality of switches moveable in response to each said element, means for connecting said switches into respective electrical circuits over a range of said switch movement, and a plurality of means effective to actuate said switches as a function of switch position, the switch-actuating means being distributed in a code-representing pattern over a plurality of different switch positions whereby to actuate said switches in different code patterns at said different positions.

8. An encoder as in claim 7 wherein each said element is a lever said element-mounting means is a housing having means including a slot guiding the movement of said lever, said switches are mounted on said lever for movement therewith, and said connecting means includes slide busses and contacts in sliding engagement with said busses during said motion of said lever.

9. An encoder as in claim 8 further comprising means for generating a plurality of tones, and a plurality of generator input means for selecting respective tones to be generated thereby, said connecting means connecting said switches in circuit with respective ones of said generator input means whereby to select said tones, and said switch actuating means being arranged to select different groups of at least two tones each, for each different lever position.

10. An encoder as in claim 8 further comprising a toothed rack on at least one of said levers, a pinion interengaging with each said rack, and a print wheel drive shaft connected to be driven by each said pinion.

11. An encoder as in claim 9 further comprising indicia each positioned for correlation with a respective one of said lever positions, whereby to ascribe data-selecting significance to said positions.

12. An encoder as in claim 7 comprising a plurality of said elements positioned in a desired order, respective mounting means, switches, connecting means and switch-actuating means for each of said elements, and means for enabling the electrical circuits of the switches of successive elements in a sequence corresponding to their position order.

13. An apparatus for encoding numerical data comprising:

a tone generator provided with a plurality of input leads whose selective electrical interconnection determines the frequency of the tone generator output pulses;

a housing having numerical indicia at successive locations;

means mounted on the housing for movement to register with desired indicia;

first means mounted on said moveable means for movement therewith, and electrically coupled to respective input leads of the tone generator;

second means statically mounted in said housing in confronting relation to said moving means and arranged to register with said first means in selected patterns as a function of the position of said moving means relative to said housing;

and a return circuit path to said tone generator;

said first and second means cooperating to connect said first means selectively to said return circuit path for selective input lead activation in accordance with said pattern when said first and second means are brought into registry by the movement of said moving means relative to said housing whereby tone generator outputs that are indicative of desired numerical data are selected.

* * * * *